Jan. 14, 1936.                M. A. GOLDMAN                 2,028,061
                                  FILTER
                  Original Filed Dec. 29, 1930    3 Sheets-Sheet 1
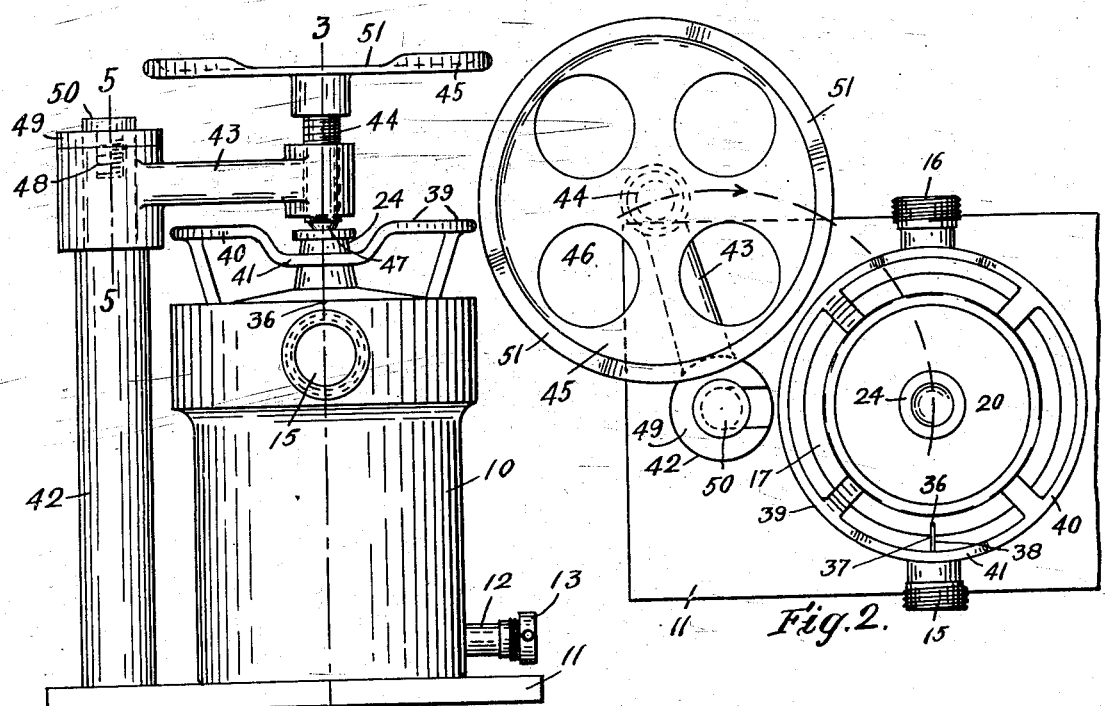
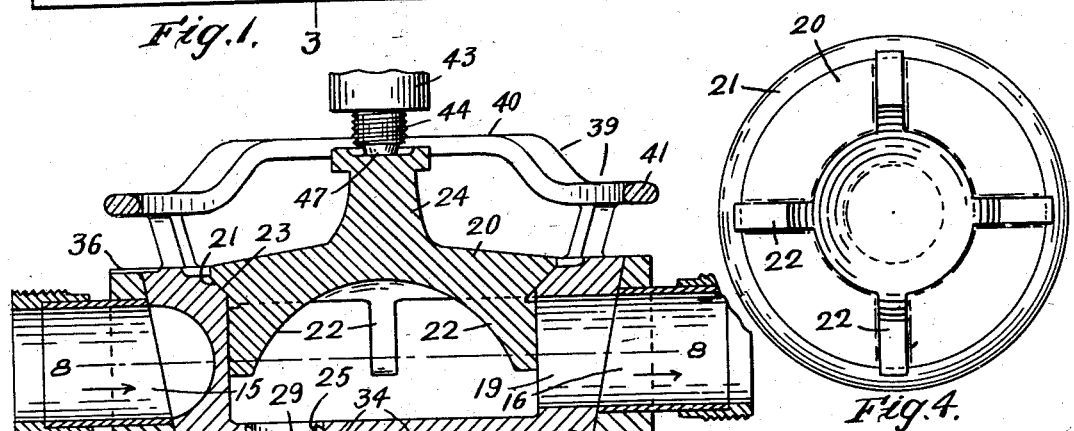
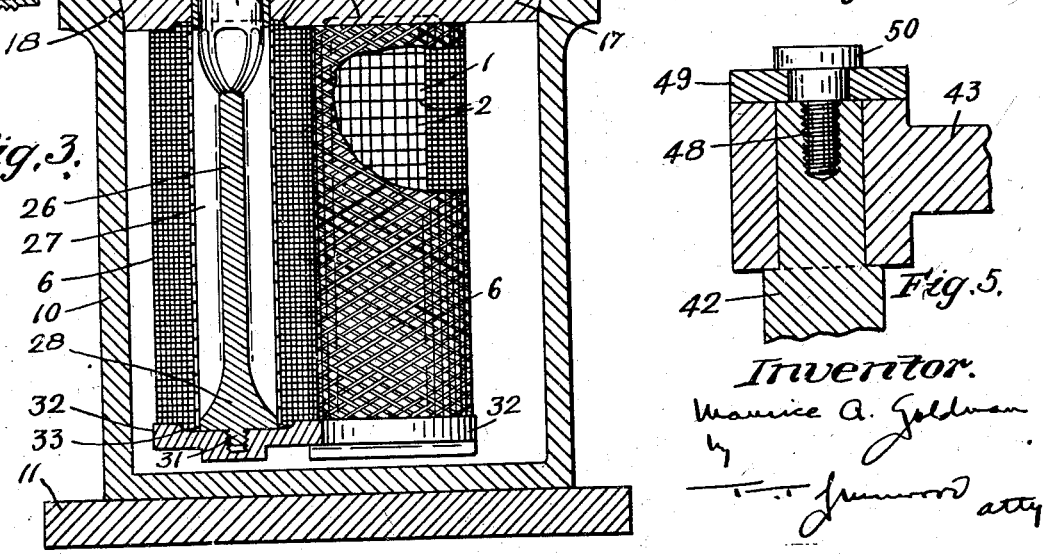
Inventor.
Maurice A. Goldman Jan. 14, 1936. M. A. GOLDMAN 2,028,061
FILTER
Original Filed Dec. 29, 1930  3 Sheets-Sheet 2
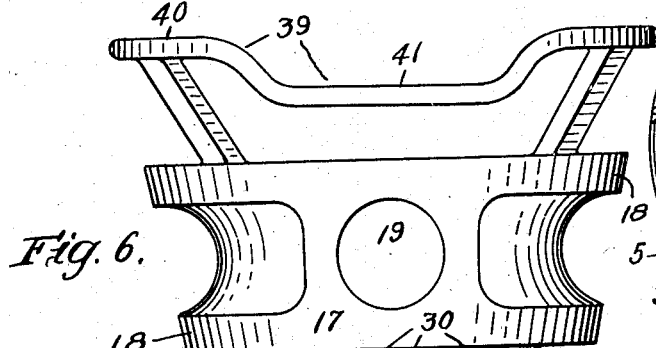
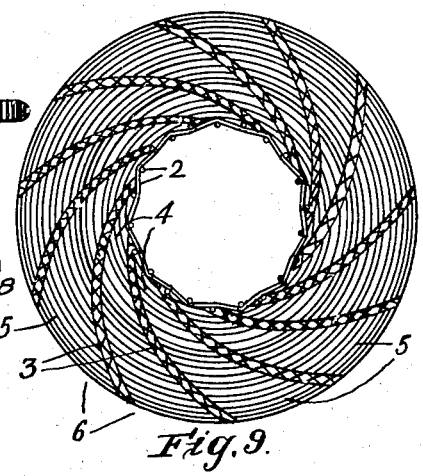
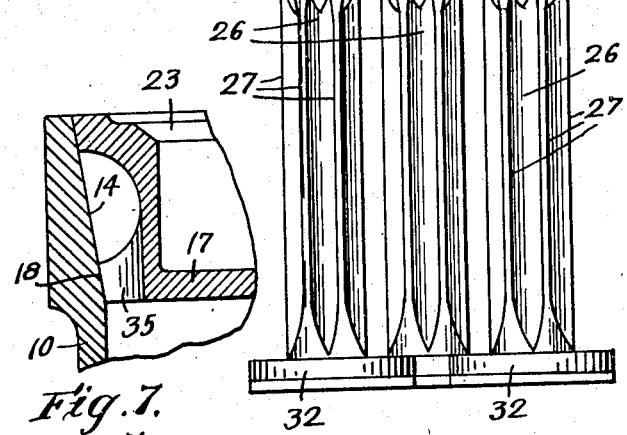
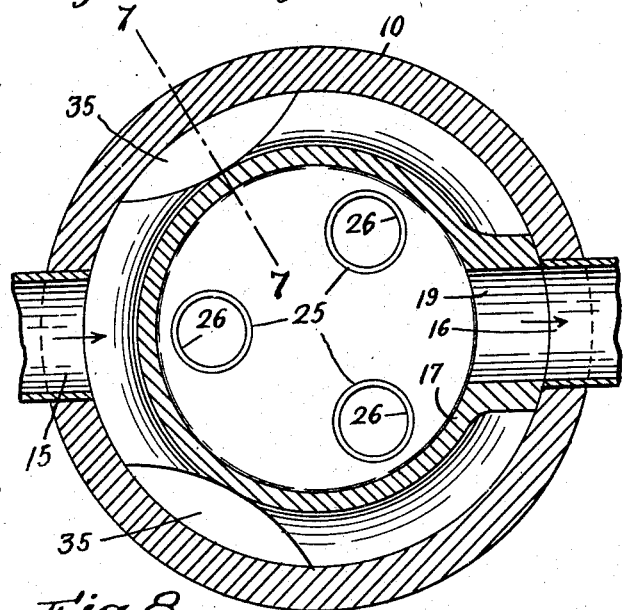
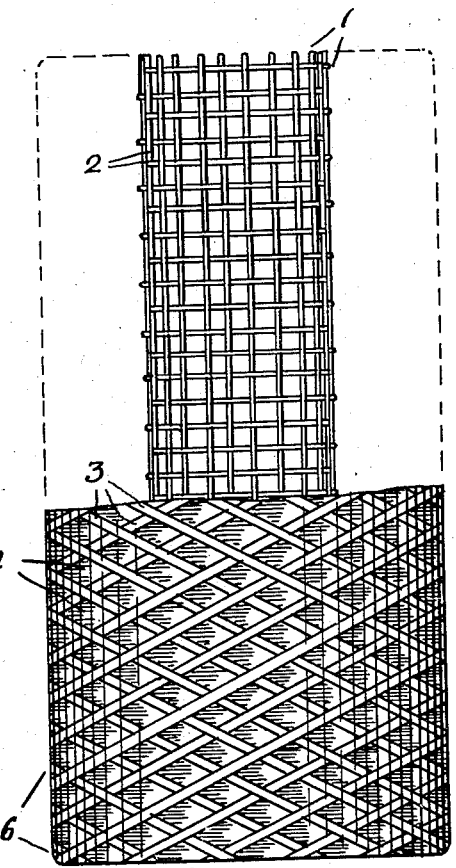

Jan. 14, 1936. M. A. GOLDMAN 2,028,061
FILTER
Original Filed Dec. 29, 1930  3 Sheets-Sheet 3

Inventor.
Maurice A. Goldman
by ―――― Greenwood atty

Patented Jan. 14, 1936

2,028,061

UNITED STATES PATENT OFFICE 2,028,061

FILTER

Maurice A. Goldman, Milford, N. H., assignor, by mesne assignments, to Commercial Filters Corporation, Boston, Mass., a corporation of Massachusetts Original application December 29, 1930, Serial No. 505,247. Divided and this application March 10, 1934, Serial No. 714,968

8 Claims. (Cl. 210—184)

This application is a division of my copending application Serial No. 505,247, filed December 29, 1930.

This invention consists of a filter apparatus and filter element for the same, hereinafter called a "tube filter", particularly designed for filtering milk for domestic consumption or other uses where large capacity and complete separation from solid impurities is important. Both my filtering apparatus and the tube filter are also well adapted for filtering many other fluids including gases.

Prior to my invention milk has been filtered by forcing the milk through a cotton flannel bag hanging from a ring and surrounded by a perforated metal cylinder. Milk does not flow readily through such a filtering element even at the start and the filtering capacity rapidly decreases owing to the clogging of the filter by the dirt filtered out. In practice to get the necessary output, it has been necessary to filter the milk hot, change the filter cloths frequently and filter under substantial pressure. Notwithstanding these precautions the filtration is not, in practice, perfect and the bag is burst occasionally, thus permitting milk to pass through the filter chamber unfiltered. Moreover, the apparatus is not easy to keep clean.

I have devised an apparatus smaller than the existing apparatus which will filter milk while still cold as perfectly as required by the health authorities and much better than the apparatus now in use. One filter apparatus will filter effectively for four hours without a change of the filter elements and without stopping. 24,000 quarts of milk have been filtered in four hours through one filtering apparatus containing three of my new tube filters.

The separation of the milk from its impurities is made in accordance with my Patent No. 1,751,000, dated March 18, 1930. The filter element shown in that patent was particularly designed to filter oil under circumstances requiring only a small capacity, that is, the filtration of perhaps a quart per minute. For milk, however, enormous capacity is required but only a short life as the complete apparatus should filter 24,000 quarts in four hours and the filtering elements ought to be discarded after a few hours for sanitary reasons.

I have, therefore, devised an improvement in my patented filtering element and also have devised a filtering apparatus especially adapted for my improved filtering element.

Fig. 1 is a side elevation.

Fig. 2 is a plan view with the pressure device for closing the top swung to one side.

Fig. 3 is a sectional view taken on line 3—3 of Fig. 1.

Fig. 4 is a bottom view of the cover.

Fig. 5 is a vertical section on line 5—5 of Fig. 1.

Fig. 6 is a side elevation of the partition 17.

Fig. 7 is a section on 7—7 of Fig. 8 showing the passage from the inlet down through the partition to the pail.

Fig. 8 is a section on line 8—8 of Fig. 3.

Fig. 9 is a horizontal section of the tube filter.

Fig. 10 is an elevation of the tube filter partly broken away to show the core.

Figure 11:
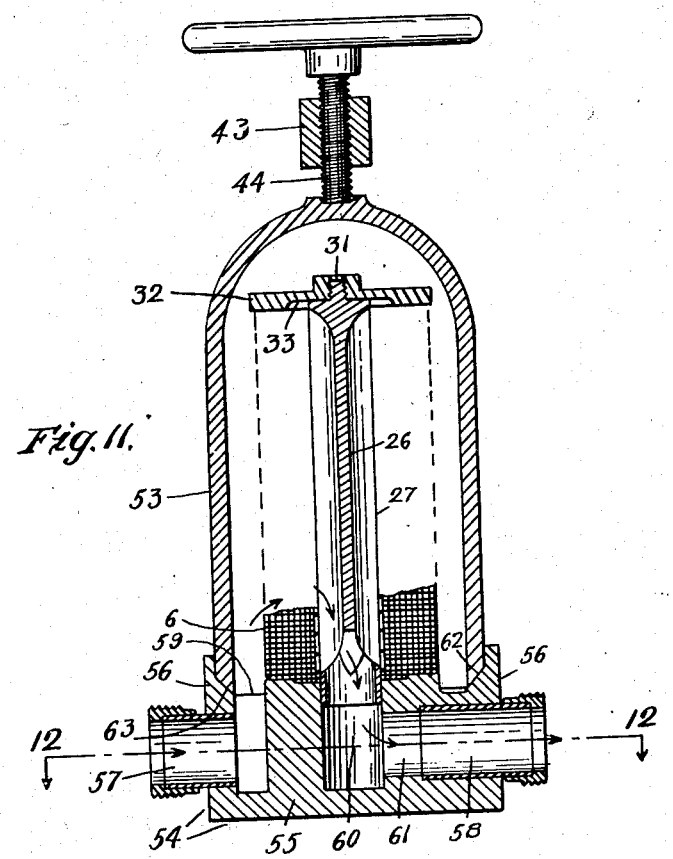
Fig. 11 is a vertical section and Fig. 12 a cross section on the line 12—12 of Fig. 11 showing a modification of my apparatus.
Figure 12:
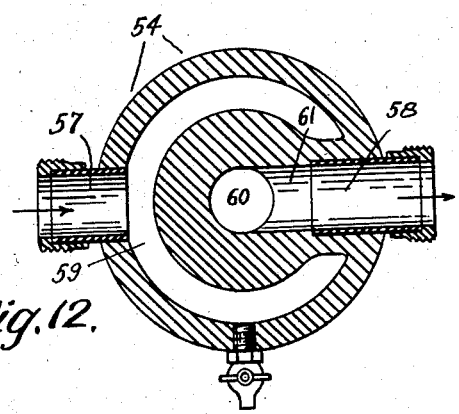

As in the tube filter of my said Patent No. 1,751,000, yarn is wound upon a perforate core. My new core, however, preferably consists of a cylinder preferably about one inch in diameter made of wire screen, 1. This screen may be made of wires, 2, about 1/40 inch in diameter spaced about ⅛ inch apart and soldered at the intersections, but the size and mesh may be varied within wide limits and yet have the desirable combination of rigidity, irregularity and perviousness. The mesh described is strong and is not easily distorted. Upon this pervious core 1, I wind in helical coils, as described in said patent, a loosely spun yarn 3, of considerable thickness, for instance, ⅛ inch, resembling a roving. The winding is accurately calculated so that a series of tunnels 4, diamond-shaped approximately in cross section, are formed extending from the exterior of the coil to the centre. For instance, using a cylinder of about six inches in length and winding two and two-ninths turns to each traverse from one side to the other of the core, about 20 turns from left to right and the same number running across from right to left, will form what may be called the inside layer against the perforate core. This layer will have about 360 holes, about ⅛ inch in each diameter through which the milk will pass. The strands of the subsequent layers should be laid uniformly upon the strands of the inside layers thus building the strands into walls of the tunnels but the crossing points of the strands are preferably moved slightly as the tube builds up as regards position on the circumference of the tube. The movement of the thread guide of the winder outward from the tube in a curved line will accomplish this result. The result will be that a series of tunnels 4, constant in diameter in line with the axis of the core, but increasing as to their other diameter as they approach the exterior of the tube filter, will be formed and the axis of the tunnels 4 will be curved between a radius and a tangent of the core, see Fig. 9. This curvature of the tunnels is advantageous. As each tube filter will have an exact predetermined number of these tunnels, for instance, about 360 in the example given, which at the exterior may be about ⅛ by ½ inch in transverse dimensions and the tunnels may be an inch deep, the filtering capacity will be great. No material filtering would be accomplished by this construction except for the fuzz upon the strands which, of course, is a fundamental element of filtering according to my Patent No. 1,751,000.

The use of the large spaces between the strands makes it vital that every one of the 360 tunnels should have a sufficient number of fuzzy fibres across it to accomplish the filtering result. For this purpose I provide yarn which is in itself fuzzy. In connection with the winding, each strand is napped so that the fibres raised by the napping element (for instance, a wire brush) extend entirely across each tunnel in a series of layers, 5, fastened in place by the subsequent turns. This may be accomplished in any suitable manner. It can be done by pressing a piece of wire brush material axially against the element as it is wound and maintaining the contact until the winding is completed. As the fibres of cotton are longer than the openings in the tunnels the napping draws a layer of the fuzzy fibres entirely across each tunnel with remarkable regularity and as the winding continues, the yarn subsequently wound positively ties the fuzzy fibres of the layer previously napped across the tunnels in place. Thus there are many layers of fuzzy fibres across each tunnel producing a number of independent filter sheets or layers, 5, equal to the number of layers of yarn wound on the core, ensuring the trapping of the impurities for which the filter is designed. The walls of the tunnels by their fuzzy fibres also retain and hold a part of the impurities. The filtering for milk is as perfect as required. This filtering element is called a tube filter and is numbered 6 in the drawings.

The size and shape of the tunnels, number of layers of yarn, thickness of yarn, material and character of threads, and amount and stiffness of fuzz may be varied within wide limits according to the capacity desired, the material to be filtered and the pressure used, but for any use, the positive spacing and napping here suggested is highly desirable. The amount of impurities which can be separated from the filtered fluid and retained by the fuzz is great because the combined area of the filtering surface of the tunnels is far greater than that of a mere filter cloth.

In the use of cloth milk filters, a layer of rejected material forms a cylinder of dirt on the outside of the cloth which rapidly increases in thickness so that in a short time the pressure necessary to force the milk through the cylinder of dirt and the filter cloth will be near the limit of strength of the filter cloth, even when the milk is heated so as to have maximum fluidity. In consequence, it is usual to arrange two sets of filtering apparatus in parallel and shift the flow of milk from one set to the other at frequent intervals so that the filter cloth can be renewed in the idle filter while the milk is passing through the other filter.

If desired, it is simple to arrange my tube filters in parallel, one or more tubes working and one or more idle, and change the tube filters as often as desired without stopping the flow of milk as in the case of the filters now used, but in practice my filter apparatus does not require any change of the tube filters during a four-hour run. The pressure starts at little or nothing and if hot milk is used the pressure need not exceed seven or eight pounds per inch at the end of a four-hour run. If cold milk is used, at the end of a four-hour run the pressure will not be too great for the tubes. My tube filters properly made will not burst or pass impurities under any reasonable pressure in the required run and the pressure developed in a four-hour run of cold milk of ordinary purity will not be excessive. A pop valve may be used to show excessive pressure.

If a filter is used longer than the period for which it is adapted the pressure will increase and impurities will be forced through. This is another reason why frequent change of the filter cloths now used is necessary. My apparatus will not require a change of tubes either on account of increase in pressure or forcing through of impurities or any other reason in a four hours run (a usual run for a day's supply). Two or three tubes filtering simultaneously in parallel will ordinarily be sufficient. More can be used without making the aggregate size of the filter apparatus approach that of existing milk filters.

It is good practice to filter the milk as it comes from the cow while still warm, and package it immediately. My filter may be inserted in a line direct from the cow to the bottle and is admirably adapted for such a system.

The present application relates to an improved apparatus in which to install my filter tubes. It consists essentially as in my Patent No. 1,751,000, of a chamber having an inlet and outlet so arranged that the fluid can pass from inlet to outlet only through the filtering material of the filter tubes.

In the filtering of many food materials, however, particularly milk, it is necessary to use great care in design to prevent the passage of unfiltered material to the outlet and avoid the use of parts not readily cleaned.

I have devised a structure in which the dangers of material passing to the outlet unfiltered are practically eliminated and the parts of which are very readily cleaned so that the milk will not be contaminated in its flow by contact with foul parts.

My apparatus consists of an inlet receptacle, an outlet receptacle fitting into the inlet receptacle by a fluid-tight taper joint without packing or gaskets and a cover fitting into the top of the outlet receptacle. The bottom of the outlet chamber has supports for the tube filters and an opening through said supports in said outlet chamber. The milk from the inlet passes to and through the filter tubes to a chamber in the outlet portion entirely within the outlet portion. The outlet portion is separable for cleaning purposes and may be removed as a whole from the inlet portion of the apparatus so that the filter tubes can be changed. The outlet chamber is closed by a cover having a taper joint having no threads or gaskets to wear and become foul and contaminate the milk. The tube filter is slid on to the support which holds it in place and yet does not obstruct materially the flow of milk through the tube filter.

My filter tubes may be installed as shown in my

Patent No. 1,751,000, March 18, 1930, but I have invented an improved filtering apparatus which is hereinafter described.

As here shown, 10 represents a pail-shaped member, hereinafter called the pail, mounted on a base plate 11. A drainage pipe 12 leads from the bottom of the pail 10 through which hot water may be passed in the purification of the pail between runs. When the apparatus is in use a cap 13 closes the drainage pipe 12. The upper part of the pail 10 is tapered as at 14 to receive the partition 17, hereinafter referred to, and in this tapered portion 14, at opposite sides thereof, is an inlet passage 15 and an outlet passage 16. Partition 17 has a tapered edge 18, tapered to fit into the tapered portion 14 of the pail 10 so as to prevent the passage of fluid from the pail 10 to the outlet portion except through the tube filters. A hole 19 is cut through the tapered portion 18 of the partition 17 and registers with the outlet passage 16 when the partition is in place in the pail. The position of the inlet may be in any portion of the pail and the outlet need not pass through the pail but as shown the two are symmetrically arranged and conform to the pipe line, which has advantages in a milk filter. The partition 17 is hollow and receives the fluid passing through the tube filters from which it passes through the outlet passage 16. A cover 20, having a tapered edge 21, and guides 22, fits accurately into a tapered opening 23 in the top of the partition 17. The cover 20 preferably has a knob 24 by means of which pressure can be applied to force the cover 20 tightly into the partition 17 and also at the same time press the partition 17 tightly into the pail 10 by reason of the fact that when the cover 20 has been seated it will press the partition 17 and press its taper 18 into the taper 14 of the pail so as to make a fluid-tight joint.

The bottom of the partition 17 has openings 25 in which are inserted any desired number of supports 26 for the tube filters 6. These supports 26 must be made and installed with care if complete filtration is desired so that no fluid can pass from the inlet to the outlet except through the tube filters. Complete filtration is important for milk but not necessarily for other materials. As here shown these supports 26 consist of castings each having six radial vanes 27 joining in a solid portion 28 at the bottom of the support but cut through at the top to form openings 29 which permit the passage of the filtered fluid to the outlet 16. The vanes 27 are enlarged circumferentially at the top as at 30 and are cut away to leave a fluid passage 29 to the outlet chamber 16 for the filtered fluid. The tubular core 1 upon which the threads 3 of the tube filter 6 are wound fits around the support 26. The bottom of the support 26 has a threaded extension 31 upon which a base 32 is screwed. Both the base 32 and the partition 17 are cut away at 33 and 34 so that when the base 32 is screwed in place the threads of the tube filter will be compressed against the bottom of the partition 17 around the opening 25 and the base 32. The core 1 meanwhile, being not readily compressible, will extend into the sunk-in portion 33 of the base and 34 of the partition 17 above referred to. When the tube filter is fastened in place as described and the cover 20 is pressed against the partition 17, thus pressing the partition 17 into the taper 14 of the pail 10 the fluid from the inlet portion of the pail 10 passes into the pail through the tube filters and their cores along the vanes of the supports 26 into the outlet and out through the outlet passage. In order to permit the fluid to pass from the inlet opening into the pail 10 passages 35 are formed in the exterior of the partition 17, Fig. 7.

When the apparatus has been assembled by placing tube filter 6 upon the supports 26, placing the partition 17 in place and the cover 20 in place upon the partition 17 the apparatus is ready to receive the fluid to be filtered.

In order that the outlet passage of the partition 17 shall register with the outlet passage 16 of the pail 10, some designating marks, as a slit 36, should be formed in the top of the pail portion at 37 and in the partition 17 at 38.

The closure partition 17 is supplied with a handle 39 having portions 40 and 41 at different levels and thus the partition 17 may be removed from the apparatus by hand by a straight upward pull and reversed and placed on the part hereinafter referred to, whenever the tube filters are changed.

In order to press the cover 20 and the closure partition 17 together so as to make a fluid-tight joint against the pressure of the fluid being filtered I have arranged a post 42 acting as a bearing for the arm 43 extending to the axis of the pail portion. The center of this arm 43 at the axis of the pail is interiorly screw-threaded to receive an exteriorly threaded rod 44 terminating in an operating wheel 45. Holes 46 in the wheel 45 facilitate turning the wheel. When this exteriorly screw-threaded rod 44 is swung to its axial position and turned so as to depress it, the lower end 47 of the rod 44 presses the knob 24 upon the cover 20 and drives it directly against the tapered portion of the partition 17 and consequently drives the partition 17 to form a tight fit with the tapered portion 14 of the pail 10. At the top of the post 42 is a bolt 48 screwed into the top of the post. A plate 49 is held down by the enlarged top 50 of the bolt 48 and thus holds the arm 43 from rising. To release the cover 20 and the partition 17 it is only necessary to raise the wheel 45 and swing the arm 43 to one side. The cover portion may then be removed by its knob and the partition 17 removed by hand, reversed and placed upon the wheel 45 which is of a size adapted to receive it. The wheel 45 may be cut away at 51 to cooperate with the depressed portion 41 of the handle 39 to leave room for the hand of the operative in laying the partition 17 on the wheel 45. The container and outlet should be marked to secure correct relative positions as at 36.

The foregoing apparatus is designed particularly for large capacity filters. For many purposes, however, a single tube filter is amply sufficient in which case the apparatus may be much simplified. In Figures 10 and 11 I have shown such an arrangement. As here shown the pail portion 53 is on top and the cover portion beneath. The partition, tube filter support and inlet and outlet are in one piece 54 having a solid bottom 55 and side walls 56. Through a side wall is cut an inlet opening 57 to be connected with the inlet of the pipe line and through the other side is an outlet opening 58 to be connected with the outlet of the pipe line. The inlet opening is open at the top as at 59 to transmit the fluid to be filtered to the pail section 53. The outlet section 54 is a solid block having an axial opening 60 at the top on which the support 26 for the tube filter is attached as above described and a horizontal opening 61 connects the axial opening 60 with the outlet 58. The part 54 has a taper joint 62 to fit the corresponding joint of the pail portion 53. The pail portion 53 is here shown as a bell shaped piece having a taper joint 63 to fit the taper joint 62 of the part 54. It is placed by hand on the part 54 and pressed to fluid-tight contact by the pressure part 47 as in the case of the three tube apparatus. The tube filter is the same and is held in place on its support 26 on the part 54, as when a plurality of tubes are used.

The foregoing is only one embodiment of my invention. It may be varied widely and should be varied according to the fluid to be filtered and the amount thereof to be filtered and the space available for the filter. All such variations from the particular embodiment of my invention here shown are included in my invention if covered by my claims.

I claim:

1. In a filtering apparatus, the combination of a container having inlet and outlet openings for the fluid to be filtered, said container being provided with a tapered seat, a cover correspondingly tapered to fit said seat, said cover being chambered to admit liquid from said inlet into the body of said container and to conduct the filtered liquid to said outlet, means accessible externally of said container for releasably holding said cover in its closed position, and means carried by said cover for removably supporting a tube filter in position to compel the liquid flowing from said inlet to said outlet to pass through the wall of said filter, said cover having a removable cap for closing the chamber therein for the filtered liquid.

2. In a filtering apparatus, the combination of a container having inlet and outlet openings for the fluid to be filtered, said container being provided with a tapered seat, a cover correspondingly tapered to fit said seat, said cover being chambered to admit liquid from said inlet into the body of said container and to conduct the filtered liquid to said outlet, means accessible externally of said container for releasably holding said cover in its closed position, and means carried by said cover for removably supporting a tube filter in position to compel the liquid flowing from said inlet to said outlet to pass through the wall of said filter, said cover having a removable chamber-closing cap connected therewith by a tapered joint, and the means for holding said cover in its closed position operating through said cap to hold the cap closed.

3. In a filtering apparatus, the combination of a container having inlet and outlet openings for the fluid to be filtered, said container being provided with a tapered seat, a cover correspondingly tapered to fit said seat, said cover being chambered to admit liquid from said inlet into the body of said container and to conduct the filtered liquid to said outlet, means accessible externally of said container for releasably holding said cover in its closed position, and means carried by said cover for removably supporting a tube filter in position to compel the liquid flowing from said inlet to said outlet to pass through the wall of said filter, said cover having a frame extending therefrom provided with opposed grip portions to be grasped by the hands and with additional intermediate parts projecting beyond the grip portions for protecting the hands when the cover is turned upside down and is rested upon a horizontal support.

4. A filtering apparatus comprising a pail portion and a cover portion having tapered seats, clamping means removably holding said pail and cover portions with their seats engaged, said pail portion having inlet and outlet means for liquid, said cover portion having inlet and outlet passages communicating with said inlet and outlet means of said pail portion, one of said passages having a plurality of openings into the interior of said pail portion, a supporting post carried by said cover portion on each opening, and a tubular filter element removably disposed on each post, the filter elements being arranged in peripherally spaced manner so that the fluid in said pail portion has free access to the surface of each filter element.

5. A filter apparatus comprising a pail portion and a cover portion, both having tapered seats, clamping means removably holding said pail and cover portions with their seats engaged, said pail and cover portions having inlet and outlet passages which traverse the line of engagement of said seats and said seats having means which isolate said passages from fluid intercommunication between the seats, one of said passages having communication with the interior of said pail portion, a plurality of tubular filter elements located in said pail portion and carried by said cover portion, and means establishing communication between the interior of said tubular elements and said other passage.

6. A filter apparatus comprising a pail portion and a cover portion, both having tapered seats, clamping means removably holding said pail and cover portions with their seats engaged, the tapered seat of said cover portion having a substantially annular groove therein and tapered faces on opposite sides of the groove that seat on the tapered seat of said pail portion, said pail portion having a fluid inlet passage that communicates with said groove and said groove opening into the interior of said pail portion, said cover portion having an outlet chamber therein, and tubular filter elements carried by said cover portion and located within said pail portion and having fluid communication with said chamber.

7. A filter apparatus comprising a pail portion and a cover portion both having tapered seats, clamping means removably holding said pail and cover portions with their seats engaged, the tapered seat of said cover portion having a peripherally-extended annular groove in the middle thereof that has confronting ends, said grooved tapered seat having tapered faces on opposite sides of the groove that seat on the tapered seat of said pail portion, said pail portion having a fluid inlet passage that communicates with said groove and said groove opening into the interior of said pail portion, said cover portion having an outlet chamber and an outlet passage that extends through the tapered seat between the ends of said groove and registers with an outlet passage in the tapered seat of said pail portion, and tubular filters carried by said cover portion within said pail portion and communicating with said outlet chamber.

8. A filter apparatus comprising a pail portion and a cover portion having an outlet chamber therein, a cover for said chamber, means providing inlet and outlet passages that are in communication with the interior of said pail portion and said chamber, tube filters carried by said cover portion within said pail portion and communicating with said chamber, clamping means directly engaged with said cover and acting through said cover to hold it on said cover portion and said cover portion on said pail portion, said clamping means comprising a fixed post disposed beside said pail and cover portions, a swinging arm on said post overlying said pail and cover portions and movable about said post into a position above said cover and cover portion and also into a position at one side thereof, and a clamping screw carried by said arm adapted to bear upon said cover.

MAURICE A. GOLDMAN.